United States Patent
Tang

(10) Patent No.: US 10,491,064 B2
(45) Date of Patent: Nov. 26, 2019

(54) ELECTRIC MACHINE ROTOR INCLUDING NESTED V-SHAPED INNER AND OUTER POCKETS

(71) Applicant: FORD GLOBAL TECHNOLOGIES, LLC, Dearborn, MI (US)

(72) Inventor: Chun Tang, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 282 days.

(21) Appl. No.: 15/435,890

(22) Filed: Feb. 17, 2017

(65) Prior Publication Data
US 2018/0241262 A1    Aug. 23, 2018

(51) Int. Cl.
| H02K 1/16 | (2006.01) |
| H02K 1/27 | (2006.01) |
| H02K 21/14 | (2006.01) |
| H02K 29/03 | (2006.01) |

(52) U.S. Cl.
CPC ........... H02K 1/2766 (2013.01); H02K 21/14 (2013.01); H02K 21/145 (2013.01); H02K 1/165 (2013.01); H02K 29/03 (2013.01); H02K 2213/03 (2013.01)

(58) Field of Classification Search
CPC .... H02K 1/2766; H02K 21/145; H02K 21/14; H02K 1/165; H02K 2213/03; H02K 29/03

USPC ........... 310/156.11, 156.53, 156.56
See application file for complete search history.

(56) References Cited

U.S. PATENT DOCUMENTS

| 7,851,958 | B2* | 12/2010 | Cai | H02K 1/2766 |
| | | | | 310/156.53 |
| 8,884,485 | B2* | 11/2014 | Jurkovic | H02K 1/2766 |
| | | | | 310/156.47 |
| 9,130,422 | B2* | 9/2015 | Rahman | H02K 1/02 |
| 10,211,690 | B2* | 2/2019 | Laldin | H02K 1/2706 |
| 2003/0173852 | A1* | 9/2003 | Biais | H02K 1/2726 |
| | | | | 310/156.43 |
| 2008/0007131 | A1* | 1/2008 | Cai | H02K 1/2766 |
| | | | | 310/156.38 |
| 2014/0125184 | A1 | 5/2014 | Takahashi | |
| 2015/0280499 | A1* | 10/2015 | Pandi | H02K 1/2766 |
| | | | | 310/156.53 |
| 2016/0248282 | A1 | 8/2016 | Jurkovic et al. | |
| 2017/0040854 | A1* | 2/2017 | Saint-Michel | H02K 3/12 |
| 2018/0175681 | A1* | 6/2018 | Tang | H02K 1/12 |
| 2018/0241262 | A1* | 8/2018 | Tang | H02K 21/145 |

* cited by examiner

*Primary Examiner* — John K Kim
(74) *Attorney, Agent, or Firm* — David B. Kelley; Brooks Kushman P.C.

(57) ABSTRACT

A rotor includes nested V-shaped inner and outer pockets defining corresponding pole arc angles relative to a common center bridge axis and vertex, respective inner and outer top bridges, and respective inner and outer center bridges. A ratio of corresponding pole arc angle dependent functions and a ratio of a sum of the inner top bridges and center bridge widths to a sum of the outer top bridges and center bridge widths are same.

12 Claims, 6 Drawing Sheets

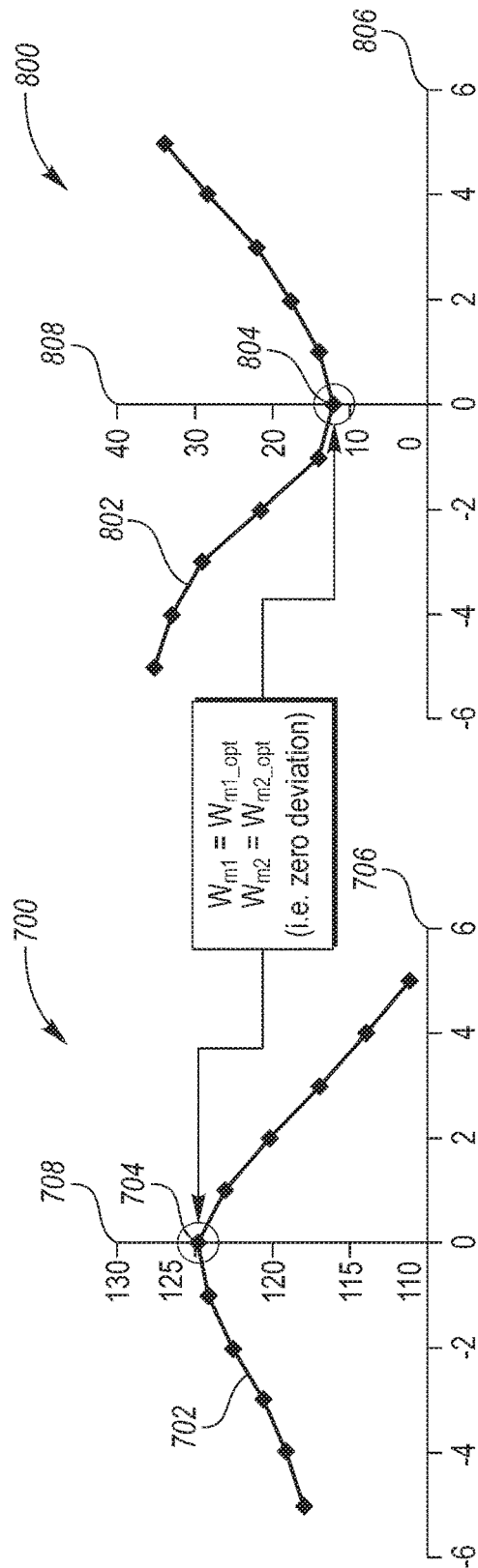

ELECTRIC MACHINE ROTOR INCLUDING NESTED V-SHAPED INNER AND OUTER POCKETS

TECHNICAL FIELD

The present disclosure relates to electric machine rotors.

BACKGROUND

Electric machines typically employ a rotor and stator to produce torque. Electric current flows through the stator windings to produce a magnetic field. The magnetic field generated by the stator may cooperate with permanent magnets within the rotor to generate torque.

SUMMARY

A rotor includes nested V-shaped inner and outer pockets defining corresponding pole arc angles relative to a common center bridge axis and vertex, respective inner and outer top bridges, and respective inner and outer center bridges. A ratio of corresponding pole arc angle dependent functions and a ratio of a sum of the inner top bridges and center bridge widths to a sum of the outer top bridges and center bridge widths are same.

A rotor includes nested V-shaped inner and outer pockets defining corresponding pole arc angles relative to a common center bridge axis and vertex, the pockets being sized to house respective inner and outer magnets having respective inner and outer widths. A ratio of corresponding pole arc angle dependent functions and a ratio of the inner widths to the outer widths are same.

An electric machine includes a stator and a rotor surrounded by the stator. The rotor has nested V-shaped inner and outer pockets, respective inner and outer top bridges, and respective inner and outer center bridges. The pockets are sized to house respective inner and outer magnets with respective inner and outer widths. A ratio of the inner widths to the outer widths and a ratio of a sum of the inner top bridges and center bridge widths to a sum of the outer top bridges and center bridge widths are same.

BRIEF DESCRIPTION OF THE DRAWINGS

FIG. 7A is a graph of average output torque of a rotor having various magnet widths;
and
FIG. 7B is a graph of peak-to-peak torque ripple having various magnet widths.

DETAILED DESCRIPTION

Figure 1:
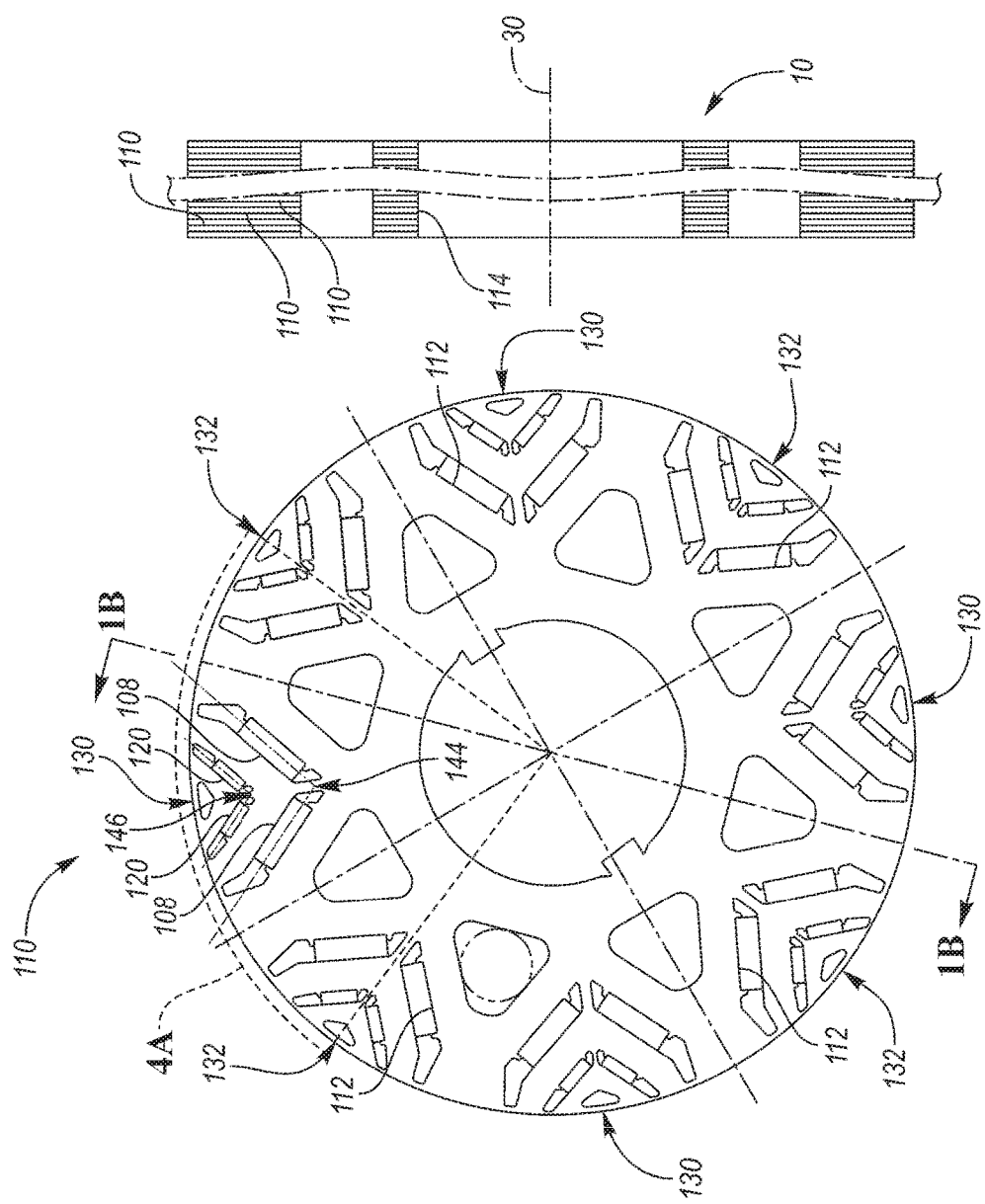
FIG. 1A is a plan view of a rotor lamination or section.
FIG. 1B is a side view of the rotor section comprised of a stack of laminations shown in FIG. 1A.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Electric machines are characterized by an undesirable oscillation in torque, which is caused by harmonics present in the airgap flux and in the airgap permeance. This torque ripple is caused by harmonics that can be substantially mitigated through proper rotor design. Permanent magnets may be positioned or oriented about the rotor of the electric machine in different ways to generate desirable magnetic fields. Each of the poles may be formed by a single permanent magnet oriented with one pole (i.e., north or south) in the radially outward direction. The poles of the rotor may be formed by groups of permanent magnets arranged to cooperatively form magnetic poles. One such arrangement orients the magnets in a V-shaped pattern. The interior portion of the "V" has similar magnetic poles that cooperate to form a magnetic pole of the rotor. An 8-pole rotor includes eight V-shaped patterns disposed about the rotor and spaced by 45°. Each of the permanent magnets may be disposed in pockets or cavities to retain the permanent magnets. These pockets or cavities are typically rectangular and sized to receive the permanent magnets. The pockets may also include cavities that are extended at opposite ends of the pockets to limit magnetic flux leakage between north and south poles of the individual permanent magnets. Voids or cavities in the rotor core impede magnetic flux because a vacuum has a relatively low magnetic permeability compared to the rotor core material (e.g., electric steel).

Permanent magnets of the rotor may be nested or layered to increase the magnitude of the magnetic field and improve magnetic field direction. The nested permanent magnets may have nested V-shapes, curves, arcs, or circular configurations. The magnets may have a plurality of rows or layers that create magnetic field guides to the airgap between the rotor and stator. The magnetic field in the airgap between the stator and rotor may be shaped or altered to optimize electric machine torque and minimize torque ripple. The relationship between bridge size, magnet size, and pocket size can particularly impact electric machine performance. The field forming chambers or cavities associated with each of the pockets may adjust the pole arc angle of the magnetic pole. Each of the magnetic poles of an eight pole rotor is designated in a 45° portion of the rotor lamination. This 45° portion is referred to as a mechanical pole pitch. Instead of allowing all of the magnetic poles to have an arc angle of 45°, the field forming chambers may be defined to guide the flux from each pole by reducing or widening the arc angle, while still keeping the magnet pockets and permanent magnets aligned from end to end. The resulting arc angle from each of the poles may still accumulate to cover the entire 360° outer peripheral surface of the rotor or cover less than the entire outer peripheral surface of the rotor.

Referring now to FIG. 1A, a lamination 110 for a rotor is shown. The lamination 110 may be stacked to form the rotor or rotor section 10 of FIG. 1B. The lamination 110 may define a plurality of pockets 108, 120 adapted to hold permanent magnets. The pockets 108, 120 may be nested or layered to provide housing for additional permanent magnets 112, 138. The center of the lamination 110 may define a circular central opening 114 with a keyway 116 for accommodating a driveshaft (not shown) that may receive a drive key such that the lamination 110 rotates about an rotational axis 30 of the rotor. The pockets may be oriented such that the permanent magnets (not shown) housed in the pockets 108, 120 form eight alternating magnetic poles 130, 132. It is well known in the art that an electric machine may have various numbers of poles arranged about the rotor (e.g., 2, 4, 6, 12, 24). The magnetic poles 130 may be configured to be north poles. The magnetic poles 132 may be configured to be south poles. The permanent magnets may also be arranged with different patterns. As shown in FIG. 1A, the pockets 108, 120, which hold permanent magnets, are arranged in a V-shape 144, 146 that is nested or layered. Referring now to FIG. 1B, a plurality of laminations 110 may form a Section A 10 of the rotor. The rotor has a circular central opening 114 for accommodating a driveshaft (not shown) and rotates about axis 30.

Figure 2:
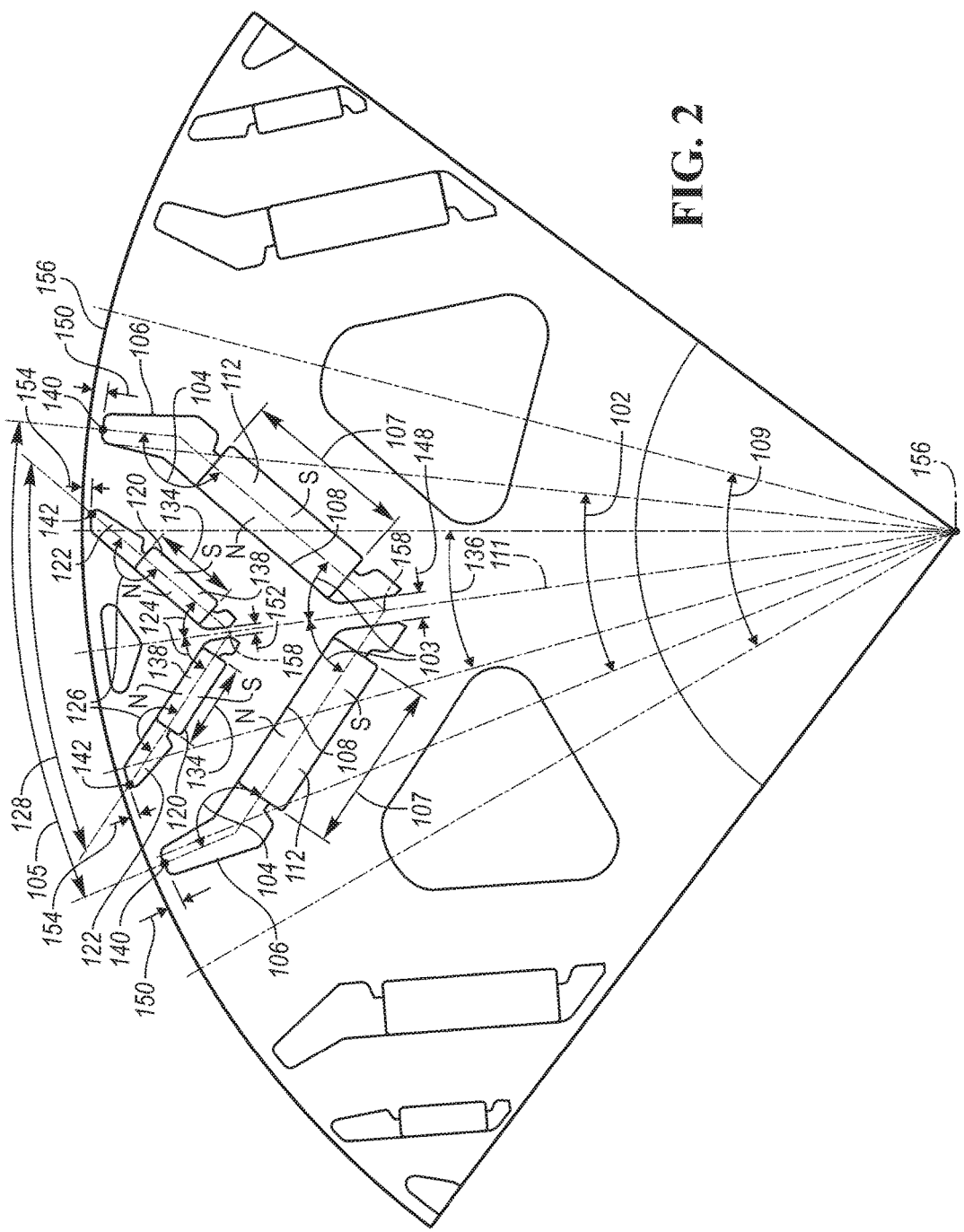
FIG. 2 is a plan view of a rotor lamination or section.

Referring now to FIG. 2, the section 10 from FIG. 1B is shown having particular pole arc angles 102, 136 corresponding to the nested pairs of permanent magnets 112, 138 and the associated chambers 106, 122. The nested pairs of permanent magnets may also have a first radially outer layered pocket 108 from the axis 30. The nested pairs may have a first outer pole arc angle 136 that is less than a first inner pole arc angle 102. The pole arc angle is shaped by the angle of the chambers 106, 122 relative to the magnet pockets 108, 120. The section 10 may have a mechanical pole pitch 109 of 45°, as shown.

Pole arc angles 102, 136 may be measured or defined using a variety of methods. As shown, pole arc angles 102, 136 are defined as the angle between the most distinguished inner corner of the most radially outward portion of chambers 106, 122 from the axis 30 of the rotor and a center bridge axis 111. The pole arc angles 102, 136 can also be measured from the outermost edges of chambers 106, 122, the inner edges of chambers 106, 122, or a hypothetical center of gravity (e.g., if the chambers were filled with a material, the center of gravity of that material). The pole arc angles 102, 136 can also be measured as orientation angles 104, 126 between the V-shaped magnet pockets 108, 120 and chambers 106, 122.

The pole arc angles 102, 136 may also be measured using the length of arcs 105, 128 across the outer periphery 156 of the rotor lamination 110 to define a surface. The surface may be defined by the length of the arc having a threshold magnitude of magnetic flux. For example, the shape of the features, chambers, may make it difficult to ascertain a generic definition and value for the pole arc angle. Under these circumstances, the magnetic flux crossing the length of the arcs 105, 128 or surface may be measured or estimated to determine the formed magnetic field. Measuring the result of the field-forming chamber may provide an improved indication of the desired pole arc angle instead of measuring the angle directly. This additional method may indirectly provide a comparison between the pole arc angles of the adjacent sections to determine whether magnetic skewing is used to reduce torque ripple.

The vertex 158 for the corresponding pole arc angles 102, 136 may be determined as an intersection of an extension of the V-shaped permanent magnet pockets, an extension of the chambers, or a combination thereof. The vertex of the pole arc angle may also be the centroid of the section or lamination or the rotational axis 30. In another embodiment, the vertex may be offset from the rotational axis 30.

In at least one other embodiment, the pole arc angles are defined by corresponding magnet angles 103, 124 and orientation angles 104, 126 relative to the magnet angles 102, 124. The orientation angle 104 has a vertex defined at a point along an intersection of the pocket 108 and the chambers 106, 122. One leg of the orientation angle is defined by a centerline passing through a centroid of the permanent magnets 112, 138. The centerline may be defined based on a center of mass or symmetry of the pocket. The other of the legs of the angle may be defined by a centerline passing through a centroid of the chamber 106, 122. The centerline may be defined based on density or symmetry of the chamber. Any of the aforementioned methods or combinations thereof may be used to determine the pole arc angle of the lamination 110.

The orientation or bending angles 104, 126 may be determined by the relationship described in Equation 1, which is given in mechanical degrees.

$$\beta = 270° - \alpha - \tan^{-1}\frac{R_r\cos\left(\frac{\theta}{2}\right) - R_c - w_m\cos\alpha}{R_r\sin\left(\frac{\theta}{2}\right) - w_m\sin\alpha} \qquad (1)$$

where the $\beta$, orientation angle 104, 126 is equal to a function of the magnet angle $\alpha$ 103, 124, the width of the permanent magnet pocket $w_m$ 107, 134 the pole arc angle $\theta$ 102, 136, the radial distance to each inner vertex 158 of the V-shaped magnet pockets 112, 138, respectively, $R_c$, and the rotor outer radius, $R_r$.

The orientation angle 104, 126, $\beta$, may be set between an angle relative to the magnet angle 103, 124, $\alpha$, as disclosed in Equation 2 below.

$$(180°-\alpha) \leq \beta \leq (270°-\alpha) \qquad (2)$$

The lamination 110 may have bridges having respective bridge widths 148, 150, 152, 154 that are related to the pole arc angles 102, 136, as described above. The lamination may have an inner center bridge having an inner center bridge width 148 and an outer center bridge having an outer center bridge width 152. The lamination may have inner top bridges having inner top bridge widths 154 and outer top bridges having outer top bridge widths 150. The bridge widths 148, 150, 152, 154 may be defined by the narrowest portion of the bridge, an average bridge width, or another predefined bridge width location. The bridge width may be defined based on respective ratios between the inner V-shaped pockets to outer V-shaped pockets. For example, a cumulative bridge width—a summation of all bridge widths associated with a given pocket layer—may be compared with another cumulative bridge width of another layer to form a bridge width ratio. The bridge width ratio may be equal to a ratio of corresponding pole arc angle dependent functions, as shown in Equation 3, which is given in mechanical degrees. Additionally, the relationship may be described in electrical degrees, as shown in Equation 4.

$$w_{b1} : w_{b2} \ldots : w_{bn} = \sin\left(\frac{P\theta_1}{4}\right) : \sin\left(\frac{P\theta_2}{4}\right) \ldots : \sin\left(\frac{P\theta_n}{4}\right) \qquad (3)$$

-continued $$w_{b1} : w_{b2} \ldots : w_{bn} = \sin\left(\frac{\theta_1}{2}\right) : \sin\left(\frac{\theta_2}{2}\right) \ldots : \sin\left(\frac{\theta_n}{2}\right) \qquad (4)$$

where P is the pole pitch of the electric machine, $\theta_n$ is equal to the respective pole arc angle 102, 136, and $w_{bn}$ is given by equation 5 below:

$$w_{bn} = 2*w_{nt} + w_{nc} \qquad (5)$$

where $w_{nt}$ is the respective top bridge width 150, 154 and $w_{nc}$ is the respective center bridge width 148, 152. As discussed above, the bridge width may be measured or defined in different ways. The top bridges for a respected V-shaped pair or other set of magnet pockets may be unequal, in which case the summation of all of the bridge widths is used.

Figure 3:
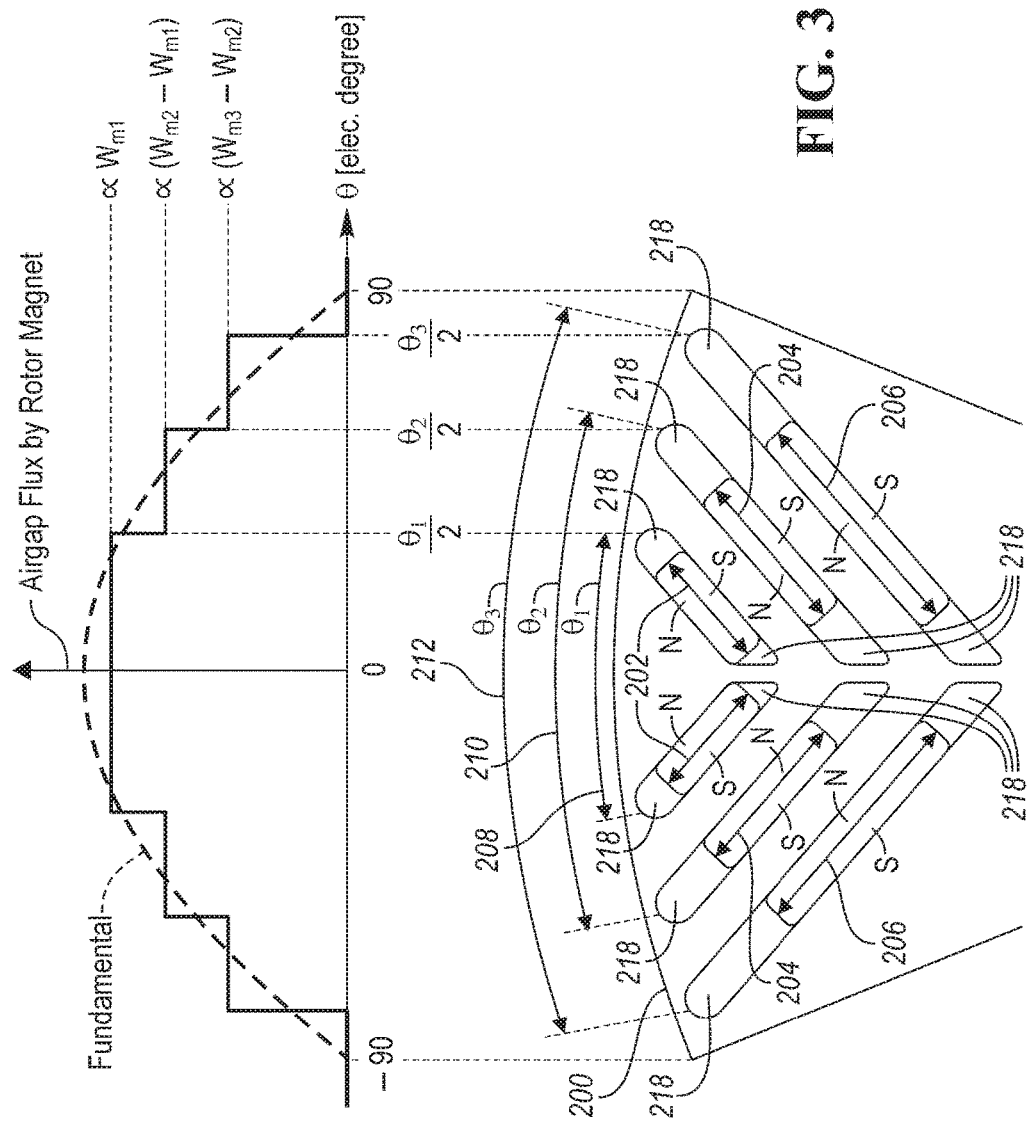
FIG. 3 is a plan view of a rotor lamination having magnets disposed in V-shaped pockets.
Figure 4:
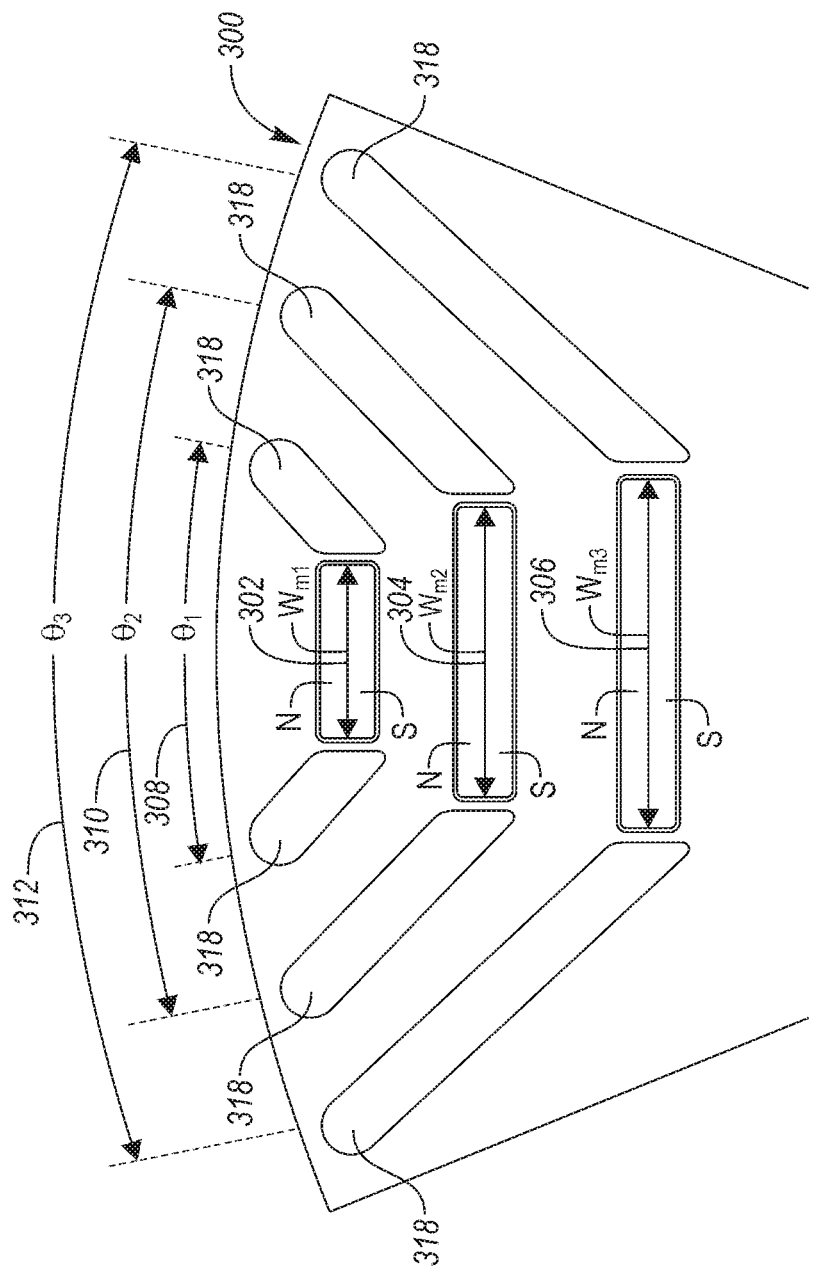
FIG. 4 is a plan view of a rotor lamination having magnets disposed in pockets.

The rotor lamination has pockets 108, 120 configured to house permanent magnets having respective widths 107, 134. The airgap flux is defined by the widths 107, 134 and the respective pole arc angles 102, 136. The pole arc angles 102, 136, magnet widths 107, 134, and bridge widths 148, 150, 152, 154 determine the magnitude or other characteristics of the airgap flux. The magnets 112, 138 may have inner and outer widths characterized by relative positions on the rotor. For example, width 134 is an inner width in relation to outer width 107. A ratio of corresponding pole arc angle 102, 136 dependent functions and a ratio of the inner magnet widths 138 and outer magnet widths 107 may be the same as depicted in equation 6 below, which is given in mechanical degrees. Additional, the relationship may be described in electrical degrees, as shown in Equation 7.

$$w_{m1} : w_{m2} \ldots : w_{mn} = \sin\left(\frac{P\theta_1}{4}\right) : \sin\left(\frac{P\theta_2}{4}\right) \ldots : \sin\left(\frac{P\theta_n}{4}\right) \qquad (6)$$

$$w_{m1} : w_{m2} \ldots : w_{mn} = \sin\left(\frac{\theta_1}{2}\right) : \sin\left(\frac{\theta_2}{2}\right) \ldots : \sin\left(\frac{\theta_n}{2}\right) \qquad (7)$$

where $\theta_n$ is equal to the respective pole arc angle 102, 136, and $w_{mn}$ is the width of a nested magnet of the V-shaped pair. The widths of each V-shaped magnet pair may be equal or unequal. When the widths of a given pair are equal, the width may be used as $w_{mn}$. When the widths are unequal, the widths of the particular nested layer of magnets may be averaged or a particular magnet width may be used. The magnet width refers to the transverse width of the magnet, which may be measured at the length of a dividing line between the north and south poles, or the narrowest (or largest) width of the magnet. Typically, permanent magnets extend the entire length and this distance is called the magnet length. The shortest distance across the magnet is called the magnet thickness, which describes the distance across the north and south pole in a permanent magnet synchronous machine. The magnet width, therefore, is the distance of a dividing line between the north and south poles of the permanent magnet, as is shown in FIGS. 3 and 4. However, different magnet orientations, thicknesses, widths, and lengths may confuse the proper measurement of magnet widths 107, 134. Magnet widths 107, 134 may be measured as the quadrature axis width of the magnet, as opposed to the direct axis width, in some embodiments.

Referring to FIG. 3, a portion of a rotor lamination 200 is shown. The rotor lamination has pockets 218 configured to house permanent magnets having respective widths 202, 204, 206. The airgap flux curve 216 is defined by the widths 202, 204, 206. The airgap flux curve 216 mimics a fundamental waveform 214. The pole arc angles 208, 210, 212 determine the magnitude or other characteristics of the airgap flux curve 216. The magnets may have inner and outer widths characterized by relative positions on the rotor. For example, width 202 is an inner width in relation to outer width 204. Also, width 204 is an inner width in relation to outer width 206. A ratio of corresponding pole arc angle dependent functions and a ratio of a sum of inner magnet widths to outer magnet widths may be the same as depicted in equation 8 below, which is in electrical degrees. The pole arc angles may be defined by any one of the aforementioned methods above.

$$w_{m1} : w_{m2} \ldots : w_{mn} = \sin\left(\frac{\theta_1}{2}\right) : \sin\left(\frac{\theta_2}{2}\right) \ldots : \sin\left(\frac{\theta_n}{2}\right) \qquad (8)$$

where $\theta_n$ is equal to the respective pole arc angles as shown in FIG. 2, and $w_{mn}$ is the width of a nested magnet of the V-shaped pair. The widths of each V-shaped magnet pair may be equal or unequal. When the widths of a given pair are equal, the width may be used as $w_{mn}$. When the widths are unequal, the widths of the particular nested layer of magnets may be averaged or a particular magnet width may be used. The magnet width refers to the transverse width of the magnet, which may be measured at the length of a dividing line between the north and south poles, or the narrowest (or largest) width of the magnet. Typically, permanent magnets extend the entire length and this distance is called the magnet length. The shortest distance across the magnet is called the magnet thickness, which would include the distance across the north and south pole in a permanent magnet synchronous machine. The magnet width, therefore, is the distance of a dividing line between the north and south poles of the permanent magnet, as is shown in FIGS. 3 and 4. However, different magnet orientations, thicknesses, widths, and lengths may confuse the proper measurement of magnet widths 202, 204, 206. Magnet widths 202, 204, 206 may be measured as the quadrature axis width of the magnet, as opposed to the direct axis width, in some embodiments.

Referring to FIG. 4, a portion of a rotor lamination 300 is shown. The rotor lamination has pockets 318 configured to house permanent magnets having respective widths 302, 304, 306. As stated above, an airgap flux curve is defined by the widths 302, 304, 306. The airgap flux curve mimics a desirable fundamental waveform. The pole arc angles 308, 310, 312 determine the magnitude or other characteristics of the air gap flux curve. The magnets have inner and outer widths characterized by relative positions on the rotor. For example, width 302 is an inner width in relation to outer width 304. Also, width 304 is an inner width in relation to outer width 306. A ratio of corresponding pole arc angle dependent functions and a ratio of sum of inner magnet widths to outer magnet widths, of which there is only one respectively, may be the same as depicted in equation 9 below, which is in electrical degrees. The pole arc angles may be defined by any one of the aforementioned methods above.

$$w_{m1} : w_{m2} \ldots : w_{mn} = \sin\left(\frac{\theta_1}{2}\right) : \sin\left(\frac{\theta_2}{2}\right) \ldots : \sin\left(\frac{\theta_n}{2}\right) \qquad (9)$$

Figure 5:
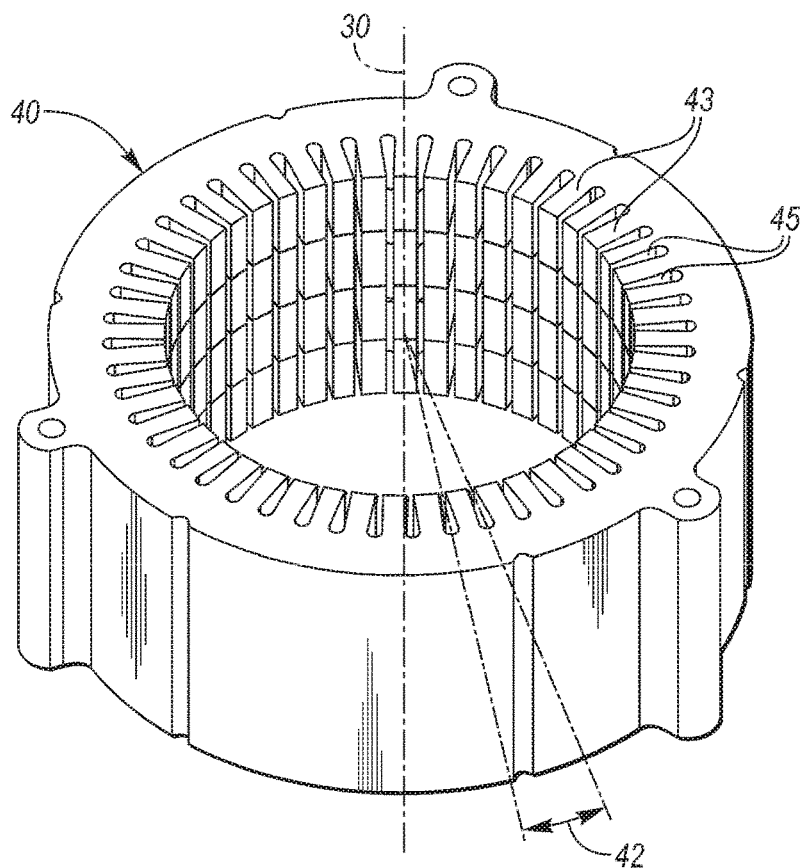
FIG. 5 is a perspective view of a stator.
Figure 6:
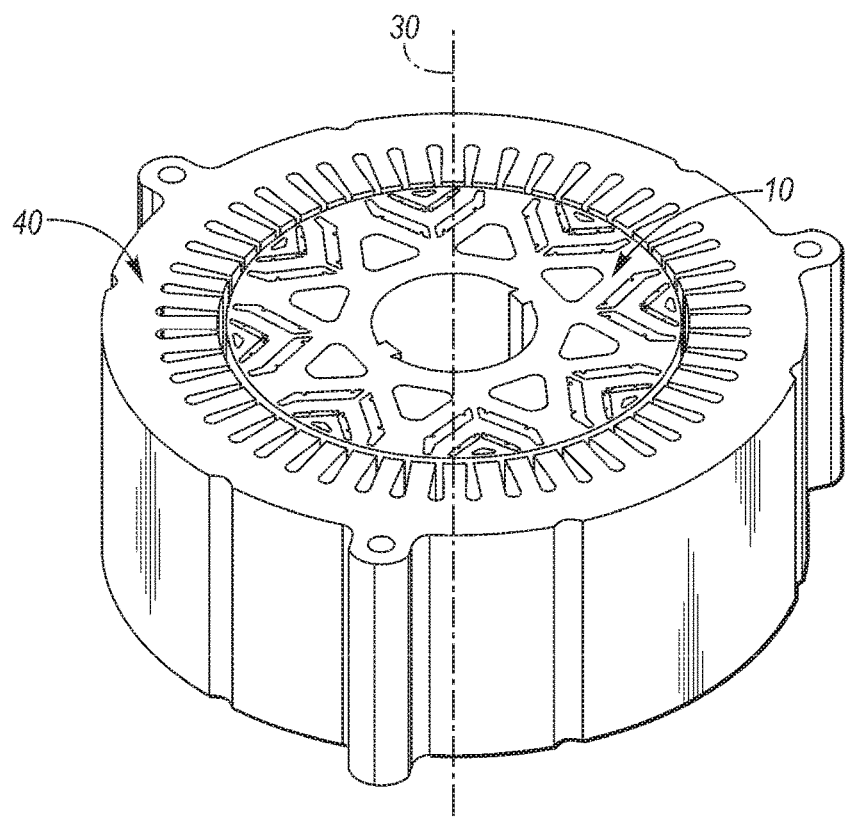
FIG. 6 is a perspective view of an electric machine having a stator and a rotor.

Now referring to FIGS. 5 and 6, a stator 40 is shown. The stator 40 has teeth 43 and stator winding cavities or slots 45 to support a set of stator windings. The stator 40 may surround a rotor 10 having permanent magnet pockets 108, 120 arranged therein.

Now referring to FIG. 7A, a graph 700 showing the average output torque 708 in newton meters compared with the deviation of magnet width 706 from the determined optimization ratio. The curve 702 indicates the average torque output 708 of the electric machine. The average torque output is maximized at point 704 when the magnet width ratio is equal to the ratio of corresponding pole arc angle dependent functions. FIG. 7B shows a graph 800 having the peak-to-peak torque ripple in newton meters across various magnet width deviation 806. The torque ripple curve 802 is minimized at point 804 when the magnet width ratio is equal to the ratio of corresponding pole arc angle dependent functions. The sign of the magnet width deviation 706, 806 may be characterized as the change in the larger nested layers value. For example, a design constraint of the magnet width may be the magnets volume. The length of the rotor and magnets may be fixed for various reasons. The thickness of the magnets may be fixed to ensure demagnetization does not occur (i.e., thin magnets are prone to demagnetization). Therefore, a maximum cumulative magnet width for all of the layers, $w_{mt}$, may be 8 mm. If $w_{m1}$ equals 3 and $w_{m2}$ equals 5, the ratio is 0.6. Resulting in a maximized output torque of 125 Nm and the ratio of corresponding pole arc angle dependent functions is also 0.6. If the same total magnet width is maintained and $w_{m1}$ is changed to 5 and $w_{m2}$ is changed to 3, the ratio is 1.66. The resulting maximum torque output may be 120 Nm when the ratio of corresponding pole arc angle dependent functions is 0.6. The peak-to-peak torque ripple also behaves in a similar fashion.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A rotor comprising:
nested V-shaped radially inner and radially outer pockets defining corresponding pole arc angles, wherein the pole arc angle corresponding to the V-shaped radially inner pockets is an angle between an inner most corner of a most radially outward portion of each side of the V-shaped radially inner pockets, wherein the pole arc angle corresponding to the V-shaped radially outer pockets is an angle between an inner most corner of a most radially outward portion of each side of the V-shaped radially outer pockets, wherein the V-shaped radially inner pockets further define outer top bridges, and an inner center bridge, wherein the V-shaped radially outer pockets further define inner top bridges and an outer center bridge, and wherein (i) a ratio of a sine of half of the pole arc angle corresponding to the V-shaped radially inner pockets to a sine of half the pole arc angle corresponding to the V-shaped radially outer pockets and (ii) a ratio of a sum of a width of each of the inner top bridges, a width of the inner center bridge, and a width of the outer center bridge to a sum of a width of each of the outer top bridges, the width of the inner center bridge, and a width of the outer center bridge are same.

2. The rotor of claim 1, wherein the pole arc angles are different.

3. The rotor of claim 2, wherein the sums are different.

4. The rotor of claim 1 further comprising, a plurality of magnets disposed within the V-shaped radially inner and radially outer pockets.

5. The rotor of claim 4, wherein the plurality of magnets disposed within the V-shaped radially inner pockets each have equal widths and the plurality of magnets disposed within the V-shaped radially outer pockets each have equal widths.

6. The rotor of claim 5, wherein cumulative widths of the magnets disposed within the V-shaped radially inner pockets and cumulative widths of the magnets disposed within the V-shaped radially outer pockets have a ratio equal to the ratio of the sine of half of the pole arc angle corresponding to the V-shaped radially inner pockets to the sine of half the pole arc angle corresponding to the V-shaped radially outer pockets.

7. A rotor comprising:
nested V-shaped radially inner and radially outer pockets defining corresponding pole arc angles, wherein the pole arc angle corresponding to the V-shaped radially inner pockets is an angle between an outer most corner of a most radially outward portion of each side of the V-shaped radially inner pockets, wherein the pole arc angle corresponding to the V-shaped radially outer pockets is an angle between an outer most corner of a most radially outward portion of each side of the V-shaped radially outer pockets, wherein the V-shaped radially inner pockets further define outer top bridges, and an inner center bridge, wherein the V-shaped radially outer pockets further define inner top bridges and an outer center bridge, and wherein (i) a ratio of a sine of half of the pole arc angle corresponding to the V-shaped radially inner pockets to a sine of half the pole arc angle corresponding to the V-shaped radially outer pockets and (ii) a ratio of a sum of a width of each of the inner top bridges, a width of the inner center bridge, and a width of the outer center bridge to a sum of a width of each of the outer top bridges, the width of the inner center bridge, and a width of the outer center bridge are same.

8. The rotor of claim 7, wherein the pole arc angles are different.

9. The rotor of claim 8, wherein the sums are different.

10. The rotor of claim 7 further comprising, a plurality of magnets disposed within the V-shaped radially inner and radially outer pockets.

11. The rotor of claim 10, wherein the plurality of magnets disposed within the V-shaped radially inner pockets each have equal widths and the plurality of magnets disposed within the V-shaped radially outer pockets each have equal widths.

12. The rotor of claim 11, wherein cumulative widths of the magnets disposed within the V-shaped radially inner pockets and cumulative widths of the magnets disposed within the V-shaped radially outer pockets have a ratio equal to the ratio of the sine of half of the pole arc angle corresponding to the V-shaped radially inner pockets to the sine of half the pole arc angle corresponding to the V-shaped radially outer pockets.

* * * * *